United States Patent
Miyamoto et al.

(10) Patent No.: US 8,874,255 B2
(45) Date of Patent: Oct. 28, 2014

(54) METHOD OF CONTROL OF ROTATION OF SPINDLE AND CONTROL SYSTEM OF MACHINE TOOL

(75) Inventors: Ryoichi Miyamoto, Kanagawa (JP); Yuya Nagahara, Sagamihara (JP); Haruka Nagahara, legal representative, Sagamihara (JP); Sumie Nagahara, legal representative, Niigata (JP); Osamu Nagahara, legal representative, Niigata (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 436 days.

(21) Appl. No.: 13/256,263

(22) PCT Filed: Mar. 13, 2009

(86) PCT No.: PCT/JP2009/055558
§ 371 (c)(1),
(2), (4) Date: Nov. 15, 2011

(87) PCT Pub. No.: WO2010/103672
PCT Pub. Date: Sep. 16, 2010

(65) Prior Publication Data
US 2012/0136474 A1 May 31, 2012

(51) Int. Cl.
*G06F 19/00* (2011.01)
*G05B 13/00* (2006.01)
(Continued)

(52) U.S. Cl.
CPC .. *B23Q 17/0976* (2013.01); *G05B 2219/41207* (2013.01); *B23C 2250/16* (2013.01); *B23C*
(Continued)

(58) Field of Classification Search
CPC ............ G05B 19/416; G05B 19/4163; G05B 2219/37434; G05B 2219/41256; G05B 2219/43058; B23Q 17/0976
USPC ........... 700/95, 117, 159, 160, 164, 170, 173, 700/177, 186, 188, 190–190, 280; 409/65, 409/131, 141; 702/33, 56; 340/540, 679, 340/680, 683; 73/104, 570, 597, 649, 658, 73/660; 82/1.11, 117, 162, 163
See application file for complete search history.

(56) References Cited

U.S. PATENT DOCUMENTS 5,170,358 A * 12/1992 Delio ............................ 700/177
5,957,016 A    9/1999 Segalman et al.
(Continued)

FOREIGN PATENT DOCUMENTS

JP    49105277 A    10/1974
JP    2005074568 A   3/2005
(Continued)

OTHER PUBLICATIONS

Robert Landers et al: "Regenerative Chatter in Machine Tools" B23Q15/12 in: "Vibration Damping, Control, and Design", B23C5/105 Apr. 2007 (Apr. 5, 2007). CRC Press, ISSN: 2154-8854 ISBN: 978-1-42-005322-7, vol. 20075215, pp. 1-28, XP055047016. Relevance is that it was cited as a category "X" in the European Search Report, copy attached hereto.

(Continued)

*Primary Examiner* — Crystal J Barnes-Bullock
(74) *Attorney, Agent, or Firm* — Paul & Paul

(57) ABSTRACT

A method of control of rotation of a spindle device and a control system of a machine tool which enable machining without generation of chatter vibration without using special tools of variable pitch cutting edges or chatter vibration detecting means. The method of control of rotation of a spindle device and control system of a machine tool according to the present invention store spindle rotational speed change data, which determines how to change a rotational speed of a spindle in accordance with an instructed speed, linked with machining conditions and stability limit data, select, from an instructed spindle rotational speed and machining conditions and the stored stability limit data, spindle rotational speed change data giving less vibration, and use the selected spindle rotational speed change data as the basis to change the rotational speed of the spindle.

4 Claims, 3 Drawing Sheets

(51) Int. Cl.
*G05B 15/00* (2006.01)
*B23Q 11/00* (2006.01)
*G01H 1/00* (2006.01)
*G01H 11/00* (2006.01)
*G01M 1/22* (2006.01)
*B23Q 17/09* (2006.01)
*G05B 19/404* (2006.01)

(52) U.S. Cl.
CPC ............... 2210/282 (2013.01); *G05B 19/404* (2013.01); *G05B 2219/41121* (2013.01)
USPC ........... 700/177; 700/188; 700/190; 700/280; 702/56; 340/683; 409/141; 73/660; 82/163

(56) References Cited

U.S. PATENT DOCUMENTS

| | | | |
|---|---|---|---|
| 6,555,985 B1 * | 4/2003 | Kawabata et al. | 318/685 |
| 6,798,603 B1 * | 9/2004 | Singh et al. | 360/73.03 |
| 7,540,697 B2 * | 6/2009 | Wang et al. | 409/141 |
| 7,657,356 B2 * | 2/2010 | Iwashita et al. | 701/50 |
| 8,014,903 B2 * | 9/2011 | Inagaki | 700/280 |
| 8,229,598 B2 * | 7/2012 | Suzuki et al. | 700/279 |
| 2002/0146296 A1 * | 10/2002 | Schmitz et al. | 409/131 |

FOREIGN PATENT DOCUMENTS

| | | |
|---|---|---|
| JP | 2005144580 A | 6/2005 |
| JP | 2007044852 A | 2/2007 |
| JP | 2007083329 A | 4/2007 |
| JP | 2007167980 A | 7/2007 |

OTHER PUBLICATIONS

Turner et al: "Modelling of the stability of variable helix end mills", International Journal CF Machine Tool Design and Research, Pergamon Press, Oxford, GB, Technical Fields, vol. 47, No. 9, Apr. 10, 2007 Searched (IPC), pp. 1410-1416, XP022025257. Relevance is that it was cited as a category "A" in the European Search Report, copy attached hereto.

Altintas V et al: "Chatter Stability of Metal Cutting and Grinding", CIRP Annals, Elsevier BV, NL, CR, FR, vol. 53, No. 2, Jan. 1, 2004, pp. 619-642, XP027601402. Relevance is that it was cited as a category "A" in the European Search Report, copy attached hereto.

\* cited by examiner

METHOD OF CONTROL OF ROTATION OF SPINDLE AND CONTROL SYSTEM OF MACHINE TOOL

TECHNICAL FIELD

The present invention relates to a method of control of rotation of a spindle which is made to rotate while holding a tool and to a control system of a machine tool.

BACKGROUND ART

In machine tools, when using a rotary tool to machine a workpiece, chatter vibration sometimes occurs. If chatter vibration occurs, it has a detrimental effect on machining, so to obtain high precision machining, chatter vibration has to be suppressed. As a method for suppressing chatter vibration, there is the method of making the pitch of the cutting edges of the rotary tool a variable one. Japanese Patent Publication (A) No. 2007-83329 discloses a rotary cutting tool by which a single tool can be used to form a variable pitch tool of various patterns. Further, Japanese Patent Publication (A) No. 2007-44852 discloses to detect chatter vibration and control the rotational speed of a spindle to a rotational speed where chatter vibration does not occur.

The prior art using a variable pitch cutting edge tool and the prior art disclosed in Japanese Patent Publication (A) No. 2007-83329 require the provision of a special tool with variable pitch cutting edges. There was the problem of increased costs of the tool. Further, the prior art disclosed in Japanese Patent Publication (A) No. 2007-44852 detects the chatter vibration to control the spindle rotational speed, so a chatter vibration detecting means becomes necessary. There was therefore the problem of increased costs of the machine tool.

SUMMARY OF INVENTION

The present invention is intended to solve this problem in the prior art. The object of the present invention is to provide a method of control of rotation of a spindle device of a machine tool and a control system of a machine tool which enable machining without generation of chatter vibration without using a special tool of variable pitch cutting edges or a chatter vibration detecting means.

To achieve this object, according to the present invention, there is provided a method of control of rotation of a spindle device of a machine tool comprising steps of storing spindle rotational speed change data, which determines how to change a rotational speed of a spindle in accordance with an instructed speed, linked with machining conditions and stability limit data, selecting, from an instructed spindle rotational speed and machining conditions and the stored stability limit data, spindle rotational speed change data giving less vibration, and using the selected spindle rotational speed change data as the basis to change the rotational speed of the spindle.

In the above rotational control method, the spindle rotational speed change data is stored linked with the machining conditions and stability limit data, so at the time of actual machining, it is possible to select the spindle rotational speed change data giving less vibration from the instructed spindle rotational speed and machining conditions and the stored stability limit data. Further, the selected spindle rotational speed change data is used as the basis to change the rotational speed of the spindle while machining, so there is resistance to chatter vibration.

The spindle rotational speed change data can be made data for changing the rotational speed of the spindle so that timings at which cutting edges of an equal pitch cutting tool which is attached to the spindle strike a workpiece are timings by which the workpiece is struck when using a tool of variable pitch cutting edges.

Further, according to the present invention, there is provided a method of control of rotation of a spindle device of a machine tool, comprising the steps of storing spindle rotational speed change data, which determines how to change a rotational speed of a spindle in accordance with an instructed speed, linked with a number of cutting edges of a tool and a pitch angle, selecting, from a number of cutting edges of a tool attached to the spindle and a desired pitch angle, spindle rotational speed change data which changes the spindle rotational speed so that timings at which cutting edges of the tool which is attached to the spindle strikes a workpiece are timings by which the workpiece is struck when using a tool of variable pitch cutting edges of the desired pitch angle, and using the selected spindle rotational speed change data as the basis to change the rotational speed of the spindle.

In the above rotational control method, in advance, the spindle rotational speed change data is stored linked with various numbers of cutting edges of tools and pitch angles, so at the time of actual machining, if inputting the desired number of cutting edges of the tool and pitch angle, it is possible to select spindle rotational speed change data so that timings at which cutting edges of the tool which is attached to the spindle strike a workpiece are timings by which the workpiece is struck when using a tool of variable pitch cutting edges of the desired pitch angle. Further, the selected spindle rotational speed change data is used as the basis to change the rotational speed of the spindle, so chatter vibration is suppressed in the same way as when using a variable pitch cutting edge tool.

Further, according to the present invention, there is provided a control system of a machine tool which makes a tool and workpiece move relative to each other and machines a workpiece, the control system of a machine tool comprising a storage unit which stores a plurality of spindle rotational speed change data linked with machining conditions and stability limit data and with a rotation instruction unit which selects, from an instructed spindle rotational speed and machining conditions and stored stability limit data, spindle rotational speed change data giving less vibration and uses the selected spindle rotational speed change data as the basis to change a rotational speed of a spindle.

Further, according to the present invention, there is provided a control system of a machine tool which makes a tool and workpiece move relative to each other and machines a workpiece, the control system of a machine tool comprising a storage unit which stores a plurality of spindle rotational speed change data linked with a number of cutting edges of a tool and a pitch angle and with a rotation instruction unit which selects, from a number of cutting edges of a tool attached to the spindle and a desired pitch angle, spindle rotational speed change data which changes the spindle rotational speed so that timings at which cutting edges of the tool which is attached to the spindle strike a workpiece are timings by which the workpiece is struck when using a tool of variable pitch cutting edges of the desired pitch angle, and uses the selected spindle rotational speed change data as the basis to change the rotation.

According to the present invention, it is possible to select prestored spindle rotational speed change data in accordance with the instructed rotational speed and machining conditions and to use the selected spindle rotational speed change data as the basis to change the spindle rotational speed and thereby suppress chatter vibration, so there is no need to prepare a special tool with variable pitch cutting edges and there is no need to detect the chatter vibration, so the costs of the tools and machine tool become smaller. Further, the spindle rotational speed is changed based on the desired spindle rotational speed instructed by the machining program, so it is possible to suppress chatter vibration without greatly changing the spindle rotational speed from the instructed spindle rotational speed.

BRIEF DESCRIPTION OF DRAWINGS

These and other objects, features, and advantages of the present invention will be explained in further detail with reference to the attached drawings based on embodiments of the present invention.

FIG. 2A is an explanatory view of a tool with equal pitch cutting edges, while

MODES FOR CARRYING OUT THE INVENTION

Figure 1:
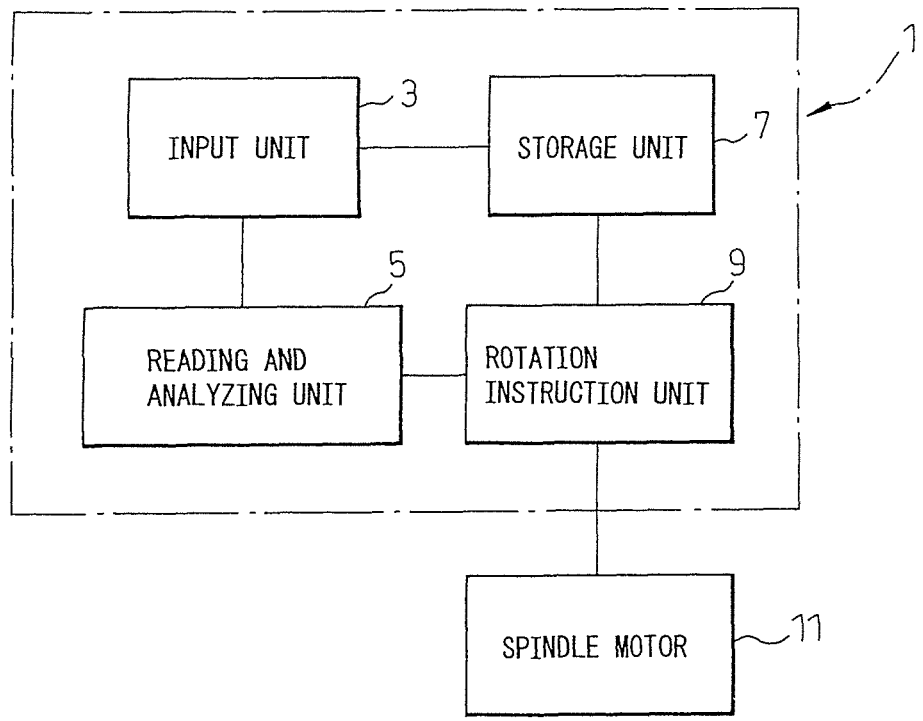
FIG. 1 is a block diagram showing a control system of a machine tool of the present invention.

Below, embodiments of the method of control of rotation of a spindle device of a machine tool and the control system of a machine tool of the present invention will be explained while referring to the drawings.

First, referring to FIG. 1, the constitution of a control system of a machine tool according to the present invention will be explained. The control system 1 of the machine tool is provided with an input unit 3, a reading and analyzing unit 5, a storage unit 7, and a rotation instruction unit 9. Various data which is input from the input unit 3 can be stored in the storage unit 7 according to need. The machining program or machining conditions for machining the workpiece are input through the input unit 3 to the control system 1. The input machining program is read and analyzed by the reading and analyzing unit 5, then the spindle rotational speed, feed rate, or other data is sent to the rotation instruction unit 9. The rotation instruction unit 9 computes the rotational speed to be instructed to a spindle motor 11 and outputs a rotational speed instruction to the spindle motor 11. The spindle motor 11 is preferably a spindle motor which has the function of a servo motor which enables positioning control of the rotational angle, rotational feed control, etc.

Figure 2A:
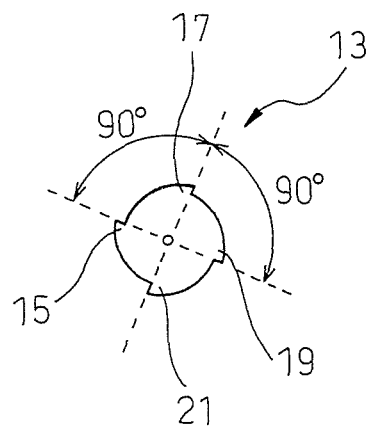
Figure 2B:
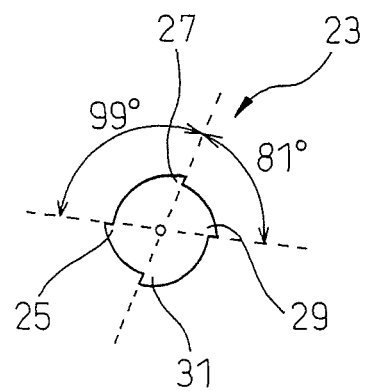
FIG. 2B is an explanatory view of a tool with variable pitch cutting edges.

As one method for suppressing chatter vibration, there is the method of using a tool with variable pitch cutting edges. Referring to FIG. 2A, an end mill 13 with equal pitch cutting edges has a first cutting edge 15, a second cutting edge 17, a third cutting edge 19, and a fourth cutting edge 21. These cutting edges are arranged at pitch angles of 90°, that is, at equal pitches. Referring to FIG. 2B, the end mill 23 with variable pitch cutting edges has a first cutting edge 25, a second cutting edge 27, a third cutting edge 29, and a fourth cutting edge 31. The first cutting edge 25 and the second cutting edge 27 have a pitch angle of 99°, the second cutting edge 27 and the third cutting edge 29 have a pitch angle of 81°, the third cutting edge 29 and the fourth cutting edge 31 have a pitch angle of 99°, and the fourth cutting edge 31 and the first cutting edge 25 have a pitch angle of 81°, that is, the edges are arranged at variable pitches.

First Embodiment

The method of control of rotation of a spindle device according to a first embodiment of the present invention will be explained.

First, in advance, the storage unit 7 stores spindle rotational speed change data, which determines how to change a rotational speed of a spindle in accordance with an instructed speed, linked various machining conditions and stability limit data and stores the plurality of data in a map form. Various formats of spindle rotational speed change data may be considered, but in the present embodiment, it is made data for changing the rotational speed of the spindle so that the timings at which cutting edges of an equal pitch cutting edge tool attached to the spindle strike a workpiece become the timings by which a workpiece is struck when using a tool of variable pitch cutting edges.

Figure 3:
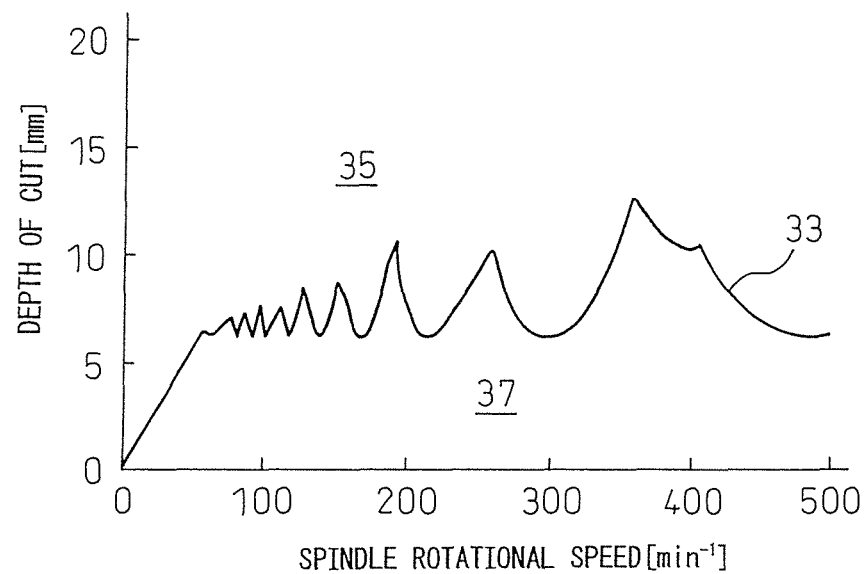
FIG. 3 is a stability limit graph of the time when using a tool of equal pitch cutting edges of FIG. 2A.
Figure 4:
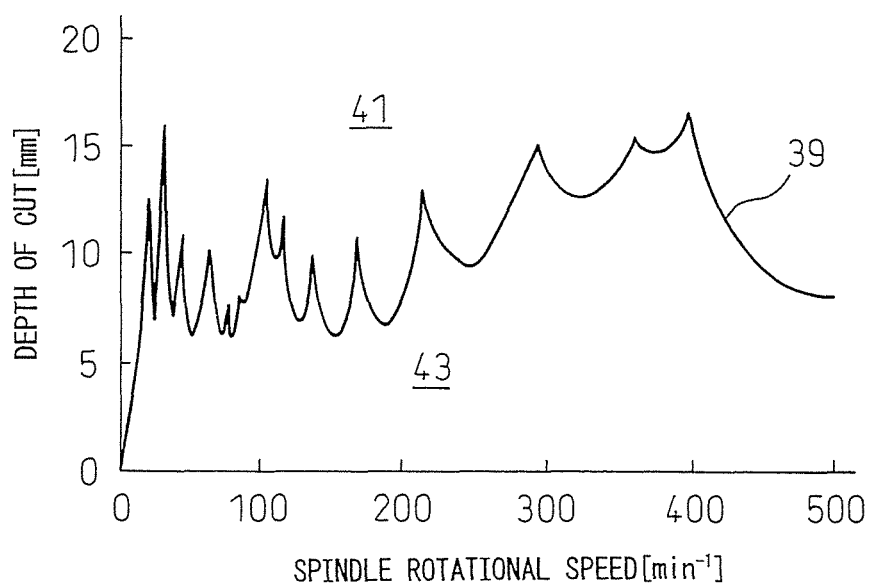
FIG. 4 is a stability limit graph of the time when using a tool of variable pitch cutting edges of FIG. 2B.

FIG. 3 is a stability limit graph when using an end mill 13 of equal pitch cutting edges of FIG. 2A for machining by a tool diameter of 50 mm and a feed rate of 144 mm/min. The abscissa shows the spindle rotational speed, while the ordinate shows the depth of cut. The ordinate in the stability limit graph of the present embodiment shows the depth of cut of a tool in the axial line direction. The part above the stability limit curve 33 is an unstable region 35 at which chatter vibration easily occurs, while the part below the stability limit curve 33 is the stable region 37 at which chatter vibration does not easily occur. FIG. 4 is a stability limit graph when using an end mill 23 of variable pitch cutting edges of FIG. 2B for machining by a tool diameter of 50 mm and a feed rate of 144 mm/min. The part above the stability limit curve 39 is an unstable region 41 at which chatter vibration easily occurs, while the part below the stability limit curve 39 is the stable region 43 at which chatter vibration does not easily occur.

For example, when using a tool of a tool diameter of 50 mm and four cutting edges arranged at equal pitches and machining by a feed rate of 144 mm/min, a spindle rotational speed of 300 min$^{-1}$, and a depth of cut of 12 mm, the maximum depth of cut in the stable region of FIG. 3 becomes about 6 mm, so if machining in that state, it becomes machining in the unstable region. However, the maximum depth of cut in the stable region of FIG. 4 becomes about 14 mm, so if selecting spindle rotational speed change data whereby the cutting edges of the tool strike the workpiece at timings of pitch angles 99°, 81°, 99°, and 81° corresponding to the stability limit data of FIG. 4, the machining is performed in the stable region and the chatter vibration is suppressed.

Figure 5:
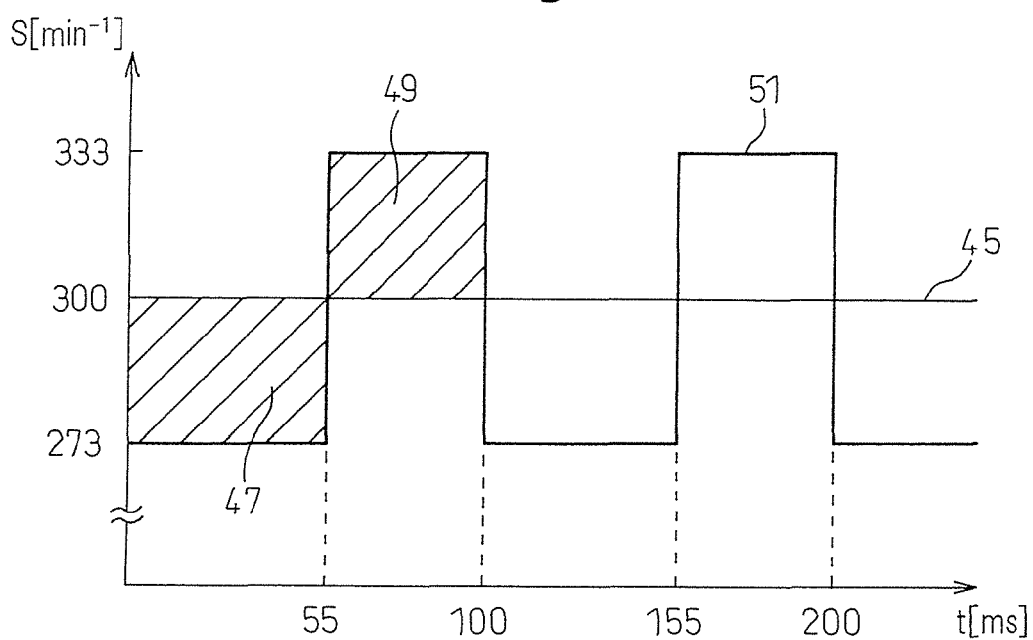
FIG. 5 is a graph of data of the change of the spindle rotational speed according to a first embodiment of the present invention.

In this case, the spindle rotational speed is 300 min$^{-1}$, so the time per rotation becomes 200 ms. The tool used has four cutting edges arranged at equal pitches, so the timing at which a cutting edge strikes becomes once every 50 ms. The pitch angle of a four cutting edge equal pitch tool is 90°, so with a pitch angle of 99°, it takes 1.1 times the time for a cutting edge to strike the workpiece. In other words, to make cutting edges of a pitch angle 90° tool strike a workpiece by a timing of when using a pitch angle 99° tool, it is sufficient to control the rotational speed of the spindle so that 55 ms is taken to make the tool rotate by 90°. Similarly, to make cutting edges of a pitch angle 90° tool strike a workpiece by timings of when using a pitch angle 81° tool, it is sufficient to control the rotational speed of a spindle so that 45 ms is taken to make the tool rotate by 90°. Therefore, the spindle rotational speed change data selected in this case, as shown in FIG. 5, becomes data repeating rotation of the spindle by a spindle rotational speed of 273 min$^{-1}$ for 55 ms and by a spindle rotational speed of 333 min$^{-1}$ for 45 ms.

The rotation instruction unit 9 uses the selected spindle rotational speed change data to control the rotational speed of the spindle motor 11 to repeat a spindle rotational speed of 273 min$^{-1}$ for 55 ms and a spindle rotational speed of 333 min$^{-1}$ for 45 ms. By such control, it is possible to use an equal pitch tool and make the cutting edges strike the workpiece by the timings of when using a variable pitch tool. Further, the amount of change of the spindle rotational speed at that time becomes minimal.

In the present embodiment, when the direction of progression of the tool changes, the timings at which cutting edges of the tool strike the workpiece end up changing with respect to the desired timings. Therefore, in accordance with the direction of progression of the tool, the rotational speed of the spindle in controlled so that the timings at which cutting edges of the tool strike the workpiece become the desired timings. By this control, the timings at which cutting edges of the tool strike the workpiece can continue to be made desired timings.

Second Embodiment

Then, the method of control of rotation of a spindle device according to a second embodiment of the present invention will be explained.

In the same way as the first embodiment, the method selects, from the data stored in the storage unit 7, the stability limit data so that the depth of cut at the instructed spindle rotational speed enters the stable region and selects spindle rotational speed change data by which cutting edges of the tool strike the workpiece at the timings of a pitch angle corresponding to the selected stability limit data. At this time, the first embodiment performed control so that the change in spindle rotational speed drew a square wave 51 such as in FIG. 5, but the second embodiment performs control so that the change in the spindle rotational speed draws a secondary curve 57 such as in FIG. 6.

Figure 6:
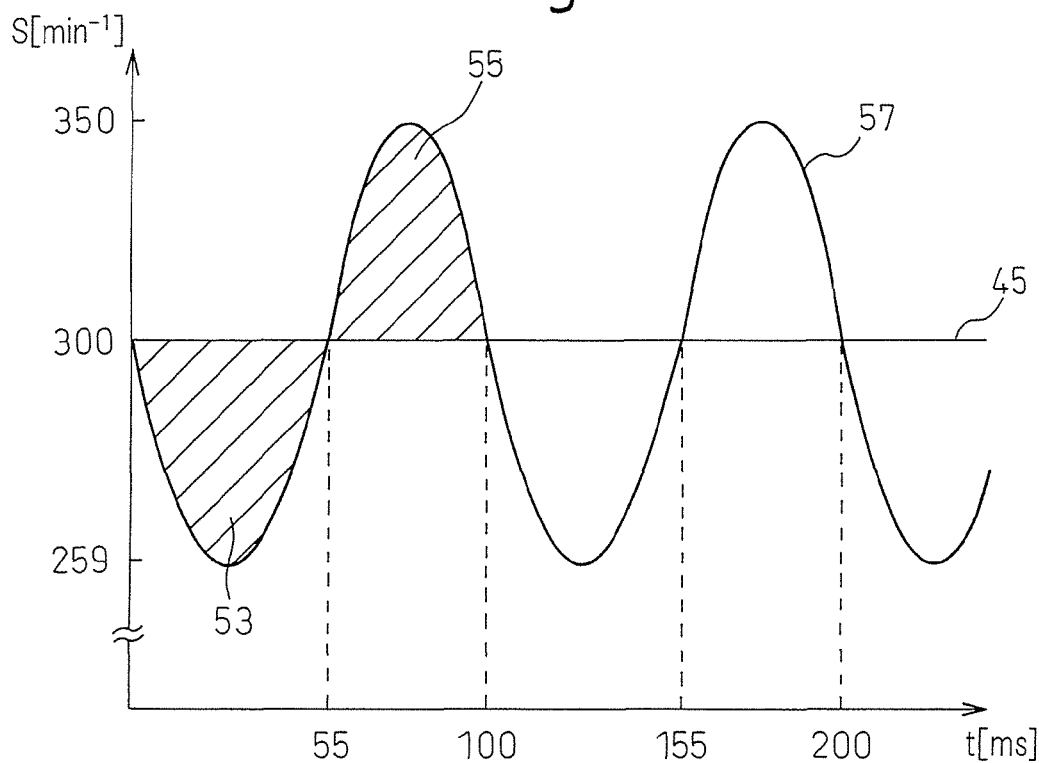
FIG. 6 is a graph of data of the change of the spindle rotational speed according to a second embodiment of the present invention.

At that time, the secondary curve 57 should be determined so that the area of the part surrounded by the instructed rotational speed 45 and square wave 51 in FIG. 5 and the area of the part surrounded by the instructed rotational speed 45 and secondary curve 57 in FIG. 6 become the same. Specifically, the secondary curve 57 is determined so that the area of the hatched part 47 of FIG. 5 and the area of the hatched part 53 of FIG. 6 become the same and the area of the hatched part 49 of FIG. 5 and the area of the hatched part 55 of FIG. 6 become the same. The rotation instruction unit 9 uses the determined secondary curve as the basis to control the rotational speed of the spindle motor 11. By performing such control, it is possible to use an equal pitch tool and make the cutting edges strike the workpiece by timings of when using a variable pitch tool and possible to reduce the impact due to the change in speed of the spindle since the spindle rotational speed changes gradually.

Third Embodiment

Then, the method of control of rotation of a spindle device according to a third embodiment of the present invention will be explained.

First, in advance, spindle rotational speed change data, which determines how to change a rotational speed of a spindle in accordance with an instructed speed, is linked with the number of cutting edges of a tool and pitch angle and stored in the storage unit 7. When the number of cutting edges of a tool and the pitch angle giving a small chatter vibration are known, the desired number of cutting edges and pitch angle are input from the input unit 3 by the machining program and parameters. The rotation instruction unit 9 selects the spindle rotational speed change data from the input number of cutting edges and pitch angle and uses the spindle rotational speed change data selected in the same way as the above-mentioned first or second embodiment as the basis to control the rotational speed of the spindle motor 11.

The invention claimed is:

1. A method of control of rotation of a spindle device of a machine tool comprising the steps of:
    storing spindle rotational speed change data, which changes a rotational speed of a spindle repeatedly in accordance with an instructed speed, linked with stability limit data, which indicates a stability limit for machining in accordance with the rotational speed of the spindle,
    selecting, from an instructed spindle rotational speed and the stored stability limit data, spindle rotational speed change data giving less vibration, and
    using the selected spindle rotational speed change data as the basis to change the rotational speed of the spindle repeatedly,
    wherein said spindle rotational speed change data is data for changing the rotational speed of the spindle so that timings at which cutting edges of an equal pitch cutting tool which is attached to the spindle strike the workpiece are timings by which the workpiece is struck when using a tool of variable pitch cutting edges.

2. A method of control of rotation of a spindle device of a machine tool, comprising the steps of:
    storing spindle rotational speed change data, which determines how to change a rotational speed of a spindle in accordance with an instructed speed, linked with a number of cutting edges of a tool and a pitch angle,
    selecting, from a number of cutting edges of a tool attached to said spindle and a desired pitch angle, spindle rotational speed change data which changes said spindle rotational speed so that timings at which cutting edges of the tool which is attached to said spindle strike a workpiece are timings by which the workpiece is struck when using a tool of variable pitch cutting edges of said desired pitch angle, and
    using the selected spindle rotational speed change data as the basis to change the rotational speed of the spindle.

3. A control system of a machine tool which makes a tool and workpiece move relative to each other and machines a workpiece,
    said control system of a machine tool comprising:
    a storage unit which stores a plurality of spindle rotational speed change data linked with stability limit data, which indicates a stability limit for machining in accordance with the rotational speed of the spindle, and
    a rotation instruction unit which selects, from an instructed spindle rotational speed and stored stability limit data, spindle rotational speed change data giving less vibration and uses the selected spindle rotational speed change data as the basis to change a rotational speed of a spindle repeatedly,
    wherein said spindle rotational speed change data is data for changing the rotational speed of the spindle so that timings at which cutting edges of an equal pitch cutting tool which is attached to the spindle strike the workpiece are timings by which the workpiece is struck when using a tool of variable pitch cutting edges.

4. A control system of a machine tool which makes a tool and workpiece move relative to each other and machines a workpiece, said control system of a machine tool comprising:

a storage unit which stores a plurality of spindle rotational speed change data linked with a number of cutting edges of a tool and a pitch angle and a rotation instruction unit which selects, from a number of cutting edges of a tool attached to said spindle and a desired pitch angle, spindle rotational speed change data which changes said spindle rotational speed so that timings by which cutting edges of the tool which is attached to said spindle strike a workpiece are timings by which the workpiece is struck when using a tool of variable pitch cutting edges of said desired pitch angle, and uses the selected spindle rotational speed change data as the basis to change the rotational speed of the spindle.

\* \* \* \* \*